April 10, 1962  W. H. DIVINE ETAL  3,028,735
AIR CONDITIONING SYSTEMS
Filed Oct. 11, 1960
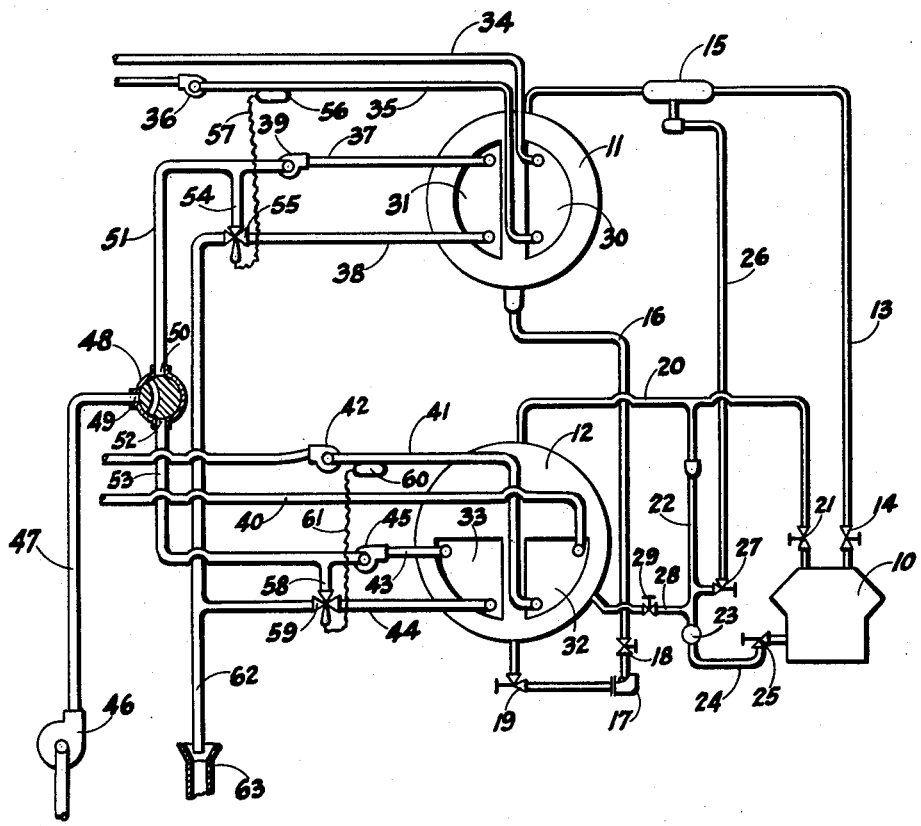
INVENTORS
WILLIAM H. DIVINE
AND JAMES R. HARNISH
BY
ATTORNEY.

United States Patent Office 3,028,735
Patented Apr. 10, 1962

3,028,735
AIR CONDITIONING SYSTEMS
William H. Divine and James R. Harnish, Spring Garden Township, York County, Pa., assignors to Borg-Warner Corporation, Chicago, Ill., a corporation of Illinois
Filed Oct. 11, 1960, Ser. No. 61,945
4 Claims. (Cl. 62—260)

This invention relates to air conditioning systems. More specifically, the invention relates to that type of air conditioning system used for both cooling a conditioning medium and heating a conditioning medium.

Frequently in an air conditioning system of the type just above-mentioned, simultaneous heating and cooling are provided the building to be conditioned. Under this circumstance, during the summer season when there is an excess of heat picked up over that which may be utilized in heating the building, some means must be provided for dissipating this excess heat. During the winter operation at lower outside air temperatures, the reverse is true; that is, insufficient heat is picked up from the building by the coolant fluid to provide for the heating needs of the building. Under this circumstance, an additional source of heat must be provided.

Applicant has devised a system wherein a source of fluid, such as well or lake water, industrial process fluids, etc., is utilized both to carry away excess heat during the summer operation, and to provide additional heat during winter operation.

In carrying out the invention, a refrigeration system is provided having condenser means and evaporator means, and wherein both are provided with two heat-exchangers. One heat-exchanger in the evaporator means receives the heat-exchange fluid to be chilled, while one heat-exchanger in the condenser means receives the heat-exchange fluid to be heated. Hereinafter, such heat-exchange fluid will be referred to as water, although it will be appreciated that other fluids may be utilized. The other heat-exchangers in the evaporator means and condenser means are adapted to receive the other fluid, such as well water, either to dissipate excess heat in the condenser means, or to provide additional heat to the evaporator means. Hereinafter, such other fluid will be referred to as "well water" but, as pointed out above, it may take the form of any other fluid adaptable for use in dissipating heat during the summer cycle, and available as a source of heat during the winter cycle. During summer operation, well water is piped through the well water heat-exchanger in the condenser means to dissipate the heat of the refrigerant therein beyond that which is utilized by the heated water in heating the building. During the winter operation, the well water is supplied to the well water heat-exchanger in the evaporator, and serves as a source of heat for the refrigerant fluid therein to supply the additional heating requirements of the building. The well water is supplied then to either the condenser means or the evaporator means, with means being provided to insure that it cannot be supplied to both simultaneously. There will, of course, be periods during the year when the heating load exactly balances the cooling load, and, therefore, there will be no flow of well water to either the condenser means or the evaporator means. The cooling load includes the heat of compression of the refrigerating aparatus.

It is an object of the invention to provide an air conditioning system of the type wherein a chilled conditioning medium and a heated conditioning medium are provided for air conditioning a building. The system is so constructed and arranged that well or lake water may be utilized, or other fluids as hereinbefore stated, both as a source of heat during winter operation and as a coolant source during summer operation.

Another object of the invention is to provide an air conditioning system, having a refrigerating system including evaporator means and condenser means, and wherein "well water" may be supplied to the evaporator means during winter operation as a source of heat, and to the condenser means during summer operation as a coolant source. Yet another object of the invention is to provide an air conditioning system of the type just above-mentioned, wherein means are provided for insuring that the "well water" is supplied either the evaporator means or the condenser means, but never simultaneously to both.

Still another object of the invention is to provide an air conditioning system, having a refrigerating system including evaporator means and condenser means, the evaporator means and condenser means each including two heat-exchangers therein and wherein "well water" may be supplied to one of the heat-exchangers in the evaporator means during winter operation as a source of heat and to one of the heat-exchangers in the condenser means during summer operation as a coolant source, and wherein a heat-exchange fluid to be chilled and heated is supplied to the other heat-exchangers in each said evaporator means and condenser means respectively, whereby simultaneous heating and cooling may be performed with a single refrigerating system and no contamination of cooling and heating coils from the "well water" may occur.

The invention consists of the novel constructions, arrangements and devices to be hereinafter described and claimed for carrying out the above-stated objects and such other objects as will appear from the following description of a preferred embodiment of the invention described with reference to the accompanying drawing, in which the FIGURE is a schematic representation of an air condition system according to the invention.

Turning now to the FIGURE, a refrigerating system is shown comprising compressor 10, a condenser means 11, and an evaporator means 12. A hot gas line 13, including a shut-off valve 14 and an oil separator 15, leads from compressor 10 to condenser means 11. A hot liquid line 16 leads from the condenser means 11 to evaporator means 12. Hot liquid line 16 has included therein a high pressure float 17, which serves as the dividing point between the high pressure part of the system and the low pressure part of the system. A pair of shut-off valves 18 and 19 are also provided in hot liquid line 16 upstream and downstream of the high pressure float 17, in order to isolate the float should this become necessary. A cold gas line 20 leads from the outlet of evaporator means 12 to the suction of compressor 10.

Cold gas line 20 has a shut-off valve 21 therein, similar to shut-off valve 14. A gas equalizing line 22 connects between cold gas line 20 and an oil receiver 23. An oil return line 24 connects the oil receiver 23 with the crankcase of compressor 10 and contains a shut-off valve 25. An oil return line 26 leads from oil separator 15 to oil receiver 23, and includes a shut-off valve 27 therein. Yet another oil return line 28, including a shut-off valve 29 therein, leads from the lower portion of evaporator means 12 to oil receiver 23.

Both condenser means 11 and evaporator means 12 are of the shell and tube type, wherein the tube bundles provided therein comprise heat-exchangers through which the liquid to be heated or cooled and the "well water" is passed while the refrigerant flows over the heat-exchangers. Condenser means 11 includes a pair of tube bundles 30 and 31 therein, while evaporator means 12 includes a pair of heat-exchangers 32 and 33 therein. As the explanation proceeds, it will be apparent that each condenser heat-exchanger may be provided with a separate shell with the refrigerant flow divided therebetween. In essence, in either case, there is effectively two refrigerant "condensers" and two refrigerant "evaporators"; the herein-disclosed invention encompasses bothe methods.

Heat-exchanger 30 in condenser means 11 has connected thereto a heated water return line 34 and a heated water supply line 35. A pump 36 is provided in heated water supply line 35. Heat-exchanger 31 in condenser means 11 has connected thereto a well water supply line 37 and a well water return line 38. Well water supply line 37 has a pump 39 therein.

Heat-exchanger 32 in evaporator means 12 has connected thereto a chilled water return line 40 and a chilled water supply line 41. Chilled water supply line 41 has a pump 42 connected therein. Heat-exchanger 33 in evaporator means 12 has connected thereto a well water supply line 43 and a well water return line 44. Well water supply line 43 has a pump 45 therein.

A deep well pump 46 is provided for supplying well water to condenser means 11 or evaporator means 12. A well water discharge line 47 leads from the outlet of pump 46 and is connected to a 3-way valve 48 at a port 49 therein. Valve 48 has a port 50, to which is connected a well water line 51 leading to the inlet of pump 39. Valve 48 has a port 52 therein, having connected thereto a well water line 53 leading to the inlet of pump 45.

Means are provided for bypassing well water back through heat-exchanger 31 in condenser means 11, and takes the form of a bypass line 58, connected between well water supply line 37 and return line 38. Flow through bypass line 54 is controlled by way of a 3-way valve 55, actuated by a thermal bulb 56 located on heated water supply line 35 and connected to valve 55 by way of a capillary 57.

Means are also provided for bypassing well water around heat-exchanger 33 in evaporator means 12, and takes the form of a bypass line 8, connected between well water supply line 43 and return line 44. Flow through bypass line 58 is controlled by way of a 3-way vlave 59, actuated by a thermal bulb 60 located on chilled water supply line 41 and connected to valve 59 by a capillary 61.

Well water return lines 38 and 44 are connected into a well water drain line 62, which leads to a drain 63.

*Operation*

In operation, the system is designed so that during those times of the year when the chilled water system picks up insufficient heat within the building to provide for the heating requirements (winter cycle), the well water may be utilized in evaporator means 12 as a source of heat. Valve 59 modulates from full bypass to no bypass to supply just the quantity of makeup well water to evaporator means 12 needed to satisfy the heating requirements of the building. During that time of the year when the chilled water picks up more heat in the building than can be utilized therein to heat the heated water (summer cycle), the well water is supplied to heat-exchanger 31 in condenser means 11 to dissipate the excess heat therein. Valve 55 modulates between full bypass and no bypass so that just the proper quantity of makeup water may be supplied condenser means 11 to just dissipate the excess heat therein.

In operation, compressor 10 delivers hot compressed refrigerant to condenser means 11, wherein the refrigerant is condensed to a liquid by imparting its heat to the water flowing through heat-exchangers 30 and 31. The liquid then flows by way of hot liquid line 16 through the high pressure float 17, wherein its pressure and corresponding temperature are reduced. The cold liquid then picks up its heat from the water flowing through the heat-exchangers 32 and 33, and is thereby vaporized. The cold vapor then flows through line 20 back to the inlet of compressor 10 to complete the cycle. The chilled and heated water is then supplied to suitable coils (not shown) for providing heating and cooling to a building structure.

During the winter cycle, valve 48 is set to communicate well water discharge line 47 with well water line 53, permitting well water flow through heat-exchanger 33 in evaporator means 12. Since the heating requirements of the building are greater than can be supplied by the heat picked up by the chilled water from the evaporator means 12, which heat is pumped up to the condenser means 11 and dissipated therein well water in heat-exchanger 33 then acts as an additional source of heat for the building. Since the building requirements will vary, it will be apparent that 3-way valve 59 will modulate to permit a greater or lesser amount of return well water to bypass directly back to the inlet of pump 45 to satisfy the varying requirements, as determined by the temperature of the chilled water in supply line 41 as transmitted to bulb 60.

During the summer cycle, valve 48 is set to communicate well water discharge line 47 with well water line 51 leading to heat-exchanger 31 in condenser 11. Since, during the summer cycle, the heat picked up by the chilled water flow in evaporator means 12 and dissipated in condenser means 11 is greater than can be utilized in the heated water flow through heat-exchanger 30 of condenser means 11, then the excess heat is dissipated to the well water flowing through heat-exchanger 31. Because of the varying amounts of excess heat to be dissipated therein, 3-way valve 55 will cycle to permit varying amounts of return well water to bypass directly back to the inlet of pump 39 to take care of the varying requirements, as determined by the temperature of the heated water in supply line 35 as transmitted to bulb 56.

It will be appreciated that, during the intermediate times of the year, the system may be so balanced that the chilled water heat pickup plus the heat of compression will be just sufficient to supply the heating requirements of the building. Under this circumstance, there will be no well water flow through either the evaporator means or condenser means. It will also be apparent that well water may flow either through the evaporator means or through the condenser means, but never through both simultaneously. Whether the flow is through the evaporator means or condenser means will depend on whether there is an excess of heat picked up by the chilled water for the building requirements, or insufficient heat picked up by the chilled water to supply the requirements of the building.

As used herein and in the claims, "heated water" and "chilled water" are used in a generic sense as referring to any heat-exchange fluid which may be utilized for adding heat to a building to be conditioned, or removing heat therefrom. The term "well water," as used herein, is used in a broad generic sense to indicate any fluid that may be utilized as a source of heat in the refrigerating system during the winter cycle of operation, and as a coolant in a refrigerating system during the summer cycle of operation.

We wish it to be understood that our invention is not to be limited to the specific constructions and arrangements shown and described, except only insofar as the claims may be so limited, as it will be apparent to those skilled in the art that changes may be made without departing from the principles of the invention.

What is claimed is:

1. An air conditioning system comprising a compressor, condenser means including a pair of heat-exchangers, and evaporator means including a pair of heat-exchangers; refrigerant flow lines connecting said compressor, condenser means and evaporator means in a closed refrigerant circuit; refrigerant expansion means connected in said circuit between said condenser means and evaporator means; water flow connections to one of said condenser heat-exchangers for supplying water to be heated thereto, "well water" flow connections to the second of said condenser heat-exchangers for supplying "well water" thereto; water flow connections to one of said evaporator heat-exchangers for supplying water to be chilled thereto, "well water" flow connections to the second of said evaporator heat-exchangers for supplying "well water" thereto; and means for supplying said "well water" to either said one condenser heat-exchanger or said one evaporator heat-exchanger.

2. The system as set out in claim 1, wherein said condenser means comprises a single shell having said pair of heat-exchangers therein and said evaporator means comprises a single shell having said pair of heat-exchangers therein.

3. An air conditioning system comprising a compressor, condenser means, an evaporator means; refrigerant flow lines connecting said compressor, condenser means and evaporator means in a closed refrigerant circuit; refrigerant expansion means connected in said circuit between said condenser means and evaporator means; said condenser means comprising a pair of heat-exchangers; a heated water circuit comprising water flow connections to one of said condenser heat-exchangers for supplying water to be heated thereto, "well water" flow connections to the second of said condenser heat-exchangers for supplying "well water" thereto for dissipating any heat beyond that required by said heated water circuit; said evaporator means comprising a pair of heat-exchangers; a chilled water circuit comprising water flow connections to one of said evaporator heat-exchangers for supplying water to be chilled thereto, "well water" flow connections to the second of said evaporator heat-exchangers for supplying "well water" thereto for supplying additional heat when the heat picked up by said chilled water circuit is insufficient for the heated water circuit; and means for supplying said "well water" to either said condenser heat-exchangers or said evaporator heat-exchangers.

4. An air conditioning system comprising a compressor, condenser means, and evaporator means; refrigerant flow lines connecting said compressor, condenser means and evaporator means in a closed refrigerant circuit; refrigerant expansion means connected in said circuit between said condenser means and evaporator means; water flow connections to said condenser means for supplying water to be heated thereto; "well water" flow connections to said condenser means for supplying "well water" thereto; water flow connections to said evaporator means for supplying water to be chilled thereto; "well water" flow connections to said evaporator means for supplying "well water" thereto; and means for segregating said "well water" from said water to be chilled or heated in said evaporator means or condenser means respectively.

References Cited in the file of this patent
UNITED STATES PATENTS

| | | |
|---|---|---|
| 2,279,657 | Crawford | Apr. 14, 1942 |
| 2,299,531 | Crawford | Oct. 20, 1942 |
| 2,935,857 | McFarlan | May 10, 1960 |

UNITED STATES PATENT OFFICE
CERTIFICATE OF CORRECTION

Patent No. 3,028,735                  April 10, 1962

William H. Divine et al.

It is hereby certified that error appears in the above numbered patent requiring correction and that the said Letters Patent should read as corrected below.

Column 2, line 66, for "tube bundles" read -- heat-exchangers --; column 3, line 27, for "58" read -- 54 --; line 35, for "8" read -- 58 --; column 4, line 6, after "therein" insert a comma; column 5, line 11, for "an" read -- and --.

Signed and sealed this 14th day of August 1962.

(SEAL)
Attest:

ERNEST W. SWIDER                  DAVID L. LADD
Attesting Officer                  Commissioner of Patents